3 Sheets—Sheet 1.

S. D. LOCKE.
Grain-Binder.

No. 8,863. Reissued Aug. 19, 1879.

*Witnesses:*
C. Clarence Poole
M. C. Chaffee

*Inventor;*
S. D. Locke
By his atty
R. D. O. Smith

N. PETERS, PHOTO-LITHOGRAPHER, WASHINGTON, D. C.

S. D. LOCKE.
Grain-Binder.

No. 8,863. Reissued Aug. 19, 1879.

*Separating the grain.*

*Witnesses:*
C. Clarence Poole
W. C. Chaffee

*Inventor:*
S. D. Locke
By his atty R. D. Smith

N. PETERS, PHOTO-LITHOGRAPHER, WASHINGTON, D. C.

S. D. LOCKE.
Grain-Binder.
No. 8,863. Reissued Aug. 19, 1879.
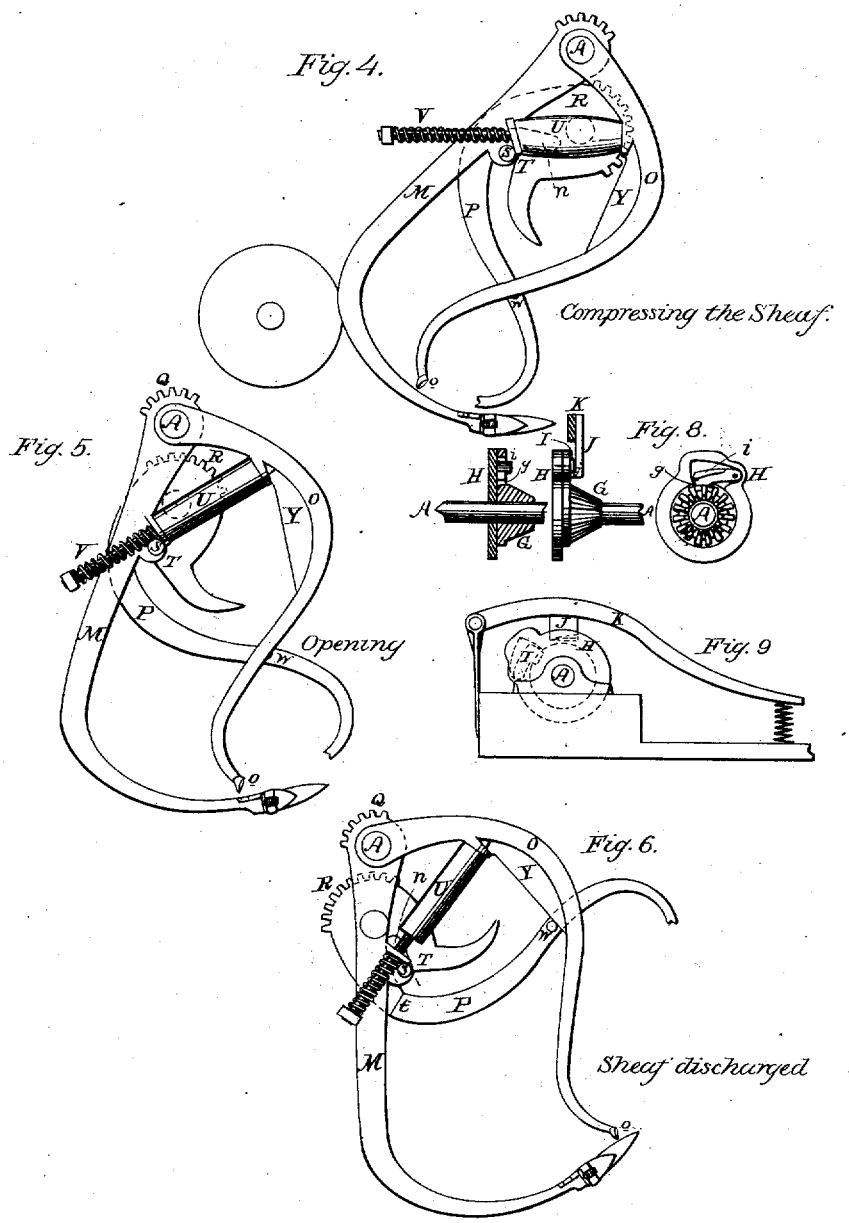
Witnesses:
C. Clarence Poole
W. E. Chaffee
Inventor:
S. D. Locke By his atty
R. W. Smith
N. PETERS, Photo-Lithographer, Washington, D. C.

UNITED STATES PATENT OFFICE.

SYLVANUS D. LOCKE, OF HOOSICK FALLS, NEW YORK.

IMPROVEMENT IN GRAIN-BINDERS.

Specification forming part of Letters Patent No. 121,290, dated November 28, 1871; Reissue No. 8,863, dated August 19, 1879; application filed June 12, 1876.

*To all whom it may concern:*

Be it known that I, SYLVANUS D. LOCKE, formerly of Janesville, in the county of Rock and State of Wisconsin, but now of Hoosick Falls, Rensselaer county, New York, have invented a new and useful Improvement in Automatic Binders for Harvesters, of which the following is a specification.

Figure 1:
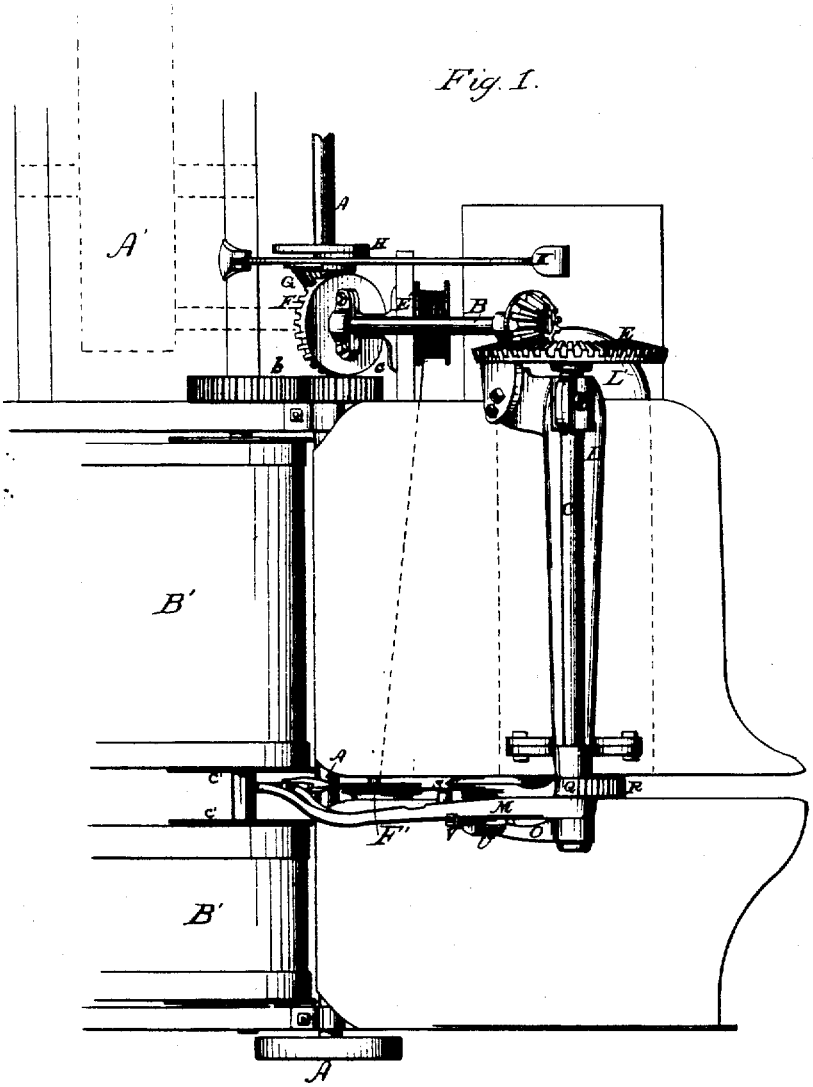
Figure 2:
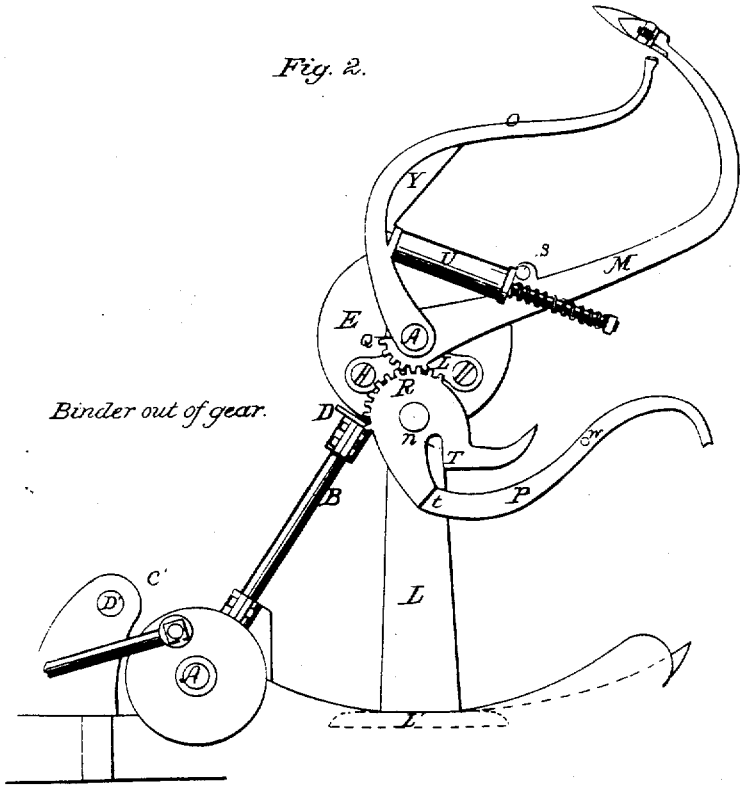
Figure 7:
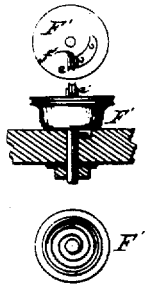
Figure 3:
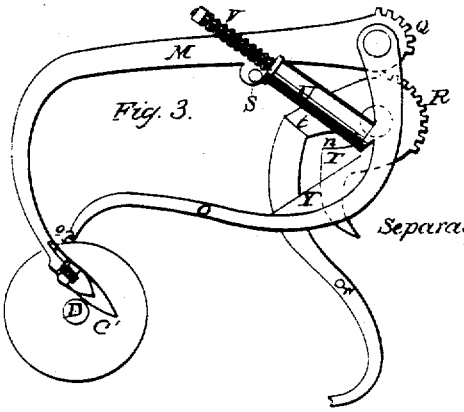

In the accompanying drawings, Figure 1 is a plan view of my invention. Fig. 2 is an end elevation of the same. Figs. 3, 4, 5, 6 are diagrams showing the binding-arms in different positions during the course of their operations. Fig. 7 represents the take-up pulley in top and bottom plan and elevation. Fig. 8 represents, in plan, elevation, and section, the pinion which transmits motion to the binding machinery. Fig. 9 is an end elevation of the same pinion with disconnecting-lever.

This invention relates to improvements in the automatic grain-binder patented to me on the 17th day of January, 1871, and numbered 111,069, to which reference is hereby made for a description of the devices by means of which the band is passed around the gavel and the ends secured, it being my intention to employ said devices or other similar ones with the devices hereinafter described.

My present invention therefore consists, first, in the devices for stopping the motion of the binder at the will of the attendant, as may be required by the condition of the grain upon the ground; second, in devices for holding the binder-arm in its elevated position after it has been disconnected from the driving mechanism; third, in the divided apron in connection with the binding devices; fourth, in a foot-plate attached to the standard for the binder-arm and its shaft, extending underneath the grain-receptacle for the support of the rack-box; fifth, in the devices by means of which the compressing-arm is made to discharge the bundle or sheaf when bound; sixth, in the mechanism by which the slack of the band is taken up.

That others may fully understand my invention, I will particularly describe it.

The arrangement of the driving mechanism which I prefer to employ is fully described in the specification of Letters Patent No. 130,227, August 6, 1872, the application for which was filed of even date with the original application for the patent of which this is a reissue; but it is evident that it is not necessary to employ the particular arrangement therein shown, as any other adapted to the particular machine to which this binding apparatus may be attached may be used.

The main driving-shaft A receives its motion from the main driving-wheel A′, (shown in dotted lines in Fig. 1,) either directly or through an intermediate counter-shaft, and transmits motion to the endless rake or apron through the gears *b c* and shaft D′, and to the binding mechanism through the shafts B C and connecting bevel-gears D E at their contiguous ends. The shaft B has, at its lower end, a bevel-gear, F, and said gear meshes with the bevel-pinion G, which runs loosely upon the shaft A. A coupling-plate, H, is placed on and keyed fast to the shaft A outside of the pinion G, and a pawl, I, is placed upon said plate in such a position as will enable it to engage with a notch, *g*, in the periphery of the pinion G, and when so engaged said pinion will revolve with the shaft A, and motion will therefore be transmitted to the binding mechanism. When the pawl I is raised from engagement with the said notch, the pinion will cease to revolve with the shaft, and the binding mechanism will be motionless during said interval. I make this disengagement subject to the will of the attendant by placing upon the side of the pawl I a flange, *i*, and arrange a plate or arm, J, with a similar flange, *j*, which, when said arm is depressed, will pass under the flange *i* and lift the pawl I out of engagement with the pinion-notch. So long as the arm J is kept depressed the pawl I will, at each revolution, pass over flange *j*, and therefore will not engage with pinion G. At the same time, in order to prevent the compressing and binding arms from sinking by their own leverage on the shaft, the lower end of the plate J may be caused to encounter the rim of the pinion G and act upon it like a brake, so that the arms may be stopped and held in any desired position. The plate J is attached to, and operated by, a foot-lever, K, which is pivoted to the frame of the machine in any suitable way, and is provided with a spring, or its equivalent, to throw up the free end when it is not desired to stop the apparatus.

The standard L is constructed of cast-iron and is hollow. At its upper end it is provided with or formed into an overhanging bracket, in which are the bearings for the shaft C; and at its lower end it is provided with a broad iron foot-plate, L′, which may be extended forward far enough to bolt to the rack-box, (described in my patent of January 17, 1871, and before referred to,) and thus insure perfect relative position for said rack-box and the twisting-head, (also described in said patent,) which is carried by the binding-arm M. I do not regard said extension of the foot-plate as being absolutely necessary, however, provided the foot of the standard and the rack-box are both bolted to the same bed-plank, as the requisite firmness may thereby apparently be secured.

The devices for carrying the binding material around the gavel, securing and severing its ends, and compressing the bundle consist of two arms, M O, mounted at the end and revolving with the shaft C, and a vibrating arm, P, pivoted at the end of the overhung part of the standard L, and a little below the shaft C.

The arm M carries the twisting mechanism and the ends of the binding-wire, while the arms O P compress the gavel into a compact bundle and permit the binding material to be drawn tightly around it. The arm M has a segment-gear, Q, upon its head, and the movement of the arm P in one direction is produced by said segment Q meshing with similar segment R on the head of the said arm P. This causes said arms O P to move toward each other when gathering and compressing the gavel. The movement of the arm P in the opposite direction is produced by a pin, S, set in the side of the arm M, and arranged to act against a cam, T, upon said arm P. The said gears Q R and the said pin S and cam T act alternately; and whereas the arm M revolves and the arm P vibrates, the compressing-arm O is coupled with the arm M by a double-acting spring or springs, U V, which permit the relative positions of the arms M O to vary in either direction within certain limits.

The compressing-arm O has at its end a laterally-projecting finger, *o*, which serves to guide and properly present the wire to the twister on its inner side, and when the gavel is bound is located in the rear of the point where the binding material is united. When the fastening has been completed the arm O is caused to advance more rapidly than the arm M, the finger *o* presses or withdraws the twisted ends of the band from the twisting mechanism, and the bound sheaf is pushed forward and dropped upon the ground. This result is attained by means of the cam T and pin S, before mentioned.

When the segment-gears go out of mesh the pin S has already passed below the part *t* of the cam T, so that the arm P cannot recede any faster than the arm M advances; but because said arms M P advance together and move upon separate centers, the pin S moves through an arc of larger radius, and advances along the cam and into the notch *n*, after which the arm P is caused to move more rapidly than the arm M, because it moves upon a shorter radius. This relative movement continues until the pin S has passed out of the notch *n* on the other side, when the motion of the arm P ceases until the segments Q R come again into mesh. When the motion of the arm P begins to be accelerated, as above described, a pin, W, set in the side of said arm, engages with the edge of a cam-plate, Y, placed in proper position upon the said arm O, and said arm is also thereby forced to advance faster than arm M, with the effect above set forth—*i. e.*, to discharge the gavel. When the cams and pins have disengaged, the springs U V return the arms M O to their proper relative positions.

The endless rake or apron B′ is driven continuously by its gear-connection with the driving-shaft A, so as to deliver the grain in a constant stream over the head of the grain-receptacle whether the binder-arm be in motion or at rest.

For use with an automatic binder, it is advantageous to have this apron B′ divided longitudinally through its central portion, so that the gathering-arm of the binder may strike into and beneath the gavel, passing into the space between the parts of the apron, as shown in Fig. 1. This manner of constructing the apron B′ permits the binding-arm M to take the grain directly from the moving apron, instead of gathering entirely from the receptacle into which the apron has delivered it, and it therefore permits the binder to be placed closer up to the apron than would be possible if it were undivided.

The drums C′, which drive the separate parts of the apron B′, are mounted upon the same shaft D′, and the end of the binding-arm may be so adjusted as to strike through the space between the drums, only clearing the shaft.

From the point of the binding-head the binding-arm M is curved in a spiral toward the center of the shaft C, so that the grain moving with the apron will not be arrested by said arm M during its passage through the space between the parts of the apron.

I prefer to use wire for a binding material, and it is wound upon the reel, which is secured to the frame at E′, or some other convenient point.

From the reel the wire runs to the take-up pulley F′, which is located beneath the grain-receptacle, as shown in Fig. 1, and immediately in the plane of revolution of the twisting-head at the end of the arm M. This take-up pulley is composed of a shell inclosing a spiral spring, and has a groove upon its periphery to receive the slack wire from the band, as shown in Fig. 7. The wire enters a hole, *f*′, in the side of the take-up pulley as near the center of rotation as practicable, and passes through said hole and out at the periphery within the slack-wire groove. A small friction-roller, $e'$, prevents chafing of the band-wire as it passes through said hole in the pulley.

When the band-wire is placed in position it is entered through the hole, as described, and so much wire is wound upon the pulley F′ as will be taken up as slack in binding the sheaf, and the end of the wire is then placed between the nippers of the twisting-head. When the twisting-head is moved forward with the arm M the wire is drawn out, first unwinding from the take-up pulley, and thereby winding up the spring therein, and then drawing so much as is required in addition through the hole, as set forth. This additional quantity will be just the length consumed in binding the sheaf. As soon as the arm M has passed over one-half of its revolution the take-up pulley will begin to wind up the slack wire, and will continue so to do until the sheaf is bound and the wire twisted. The wire is therefore kept tight around the sheaf at all times.

Having described my invention, what I claim is—

1. In combination with the rake and binder in an automatic grain-binding harvester, a clutch under control of the attendant for temporarily interrupting the continuous action of the binder while the action of the rake is unbroken.

2. In an automatic grain-binding harvester, the combination of a grain-receptacle, into which the grain is continuously fed by the raking mechanism, a binder-arm moving over such receptacle to gather and bind the grain, and a clutch under control of the attendant in the train of gear which drives the binding-arm, to stop and start said arm independently of the motion of the rake.

3. In a harvester, the combination of a grain-receptacle, into which the grain is fed by the rake, continuously-acting automatic binding mechanism located above and beneath said receptacle, and a clutch under control of the attendant in the train of gear which drives the moving parts of said mechanism, to temporarily stop said parts without interference with the motions of the rake.

4. In combination with a grain-receptacle, a rake delivering the grain in a constant stream therein, and a binding-arm working over and through said receptacle, and bringing the ends of the band beneath to be united, a clutch under control of the attendant for stopping and starting the automatic binder at will while the rake supplies the grain continuously.

5. In combination with a continuously-acting rake, and with automatic binding mechanism receiving the grain from the rake, a clutch arranged to drive said binding mechanism continuously, and a shipper held normally out of action, whereby the clutch may be unshipped at the will of the attendant, to stop the binding mechanism while the rake still acts.

6. In combination with the clutch by which the binder-arm is thrown in and out of gear at will, a stop or brake brought into action as the clutch is thrown out, to hold the binder-arm in fixed position.

7. In combination with the clutch by which the binder-arm is thrown in and out of gear, a friction-brake to hold the binder-arm as it is unclutched.

8. The combination of a binder-arm, a clutch controllable at will, and a friction-brake to hold the unclutched binder-arm in position.

9. In combination with a binder-arm and its clutch, a stop or brake controlled by the attendant, to hold said arm in position when it is unclutched.

10. In combination with a binder-arm, a compressor-arm actuated to have a rapid or kicking motion away from the binder-arm as the binding is completed, to eject the bound sheaf.

11. In combination with a grain-receptacle and with automatic binding mechanism, an arm against which the gavel is compressed as it is being bound, and mechanism actuating said arm to forcibly eject the sheaf from the receptacle as the binding is completed.

12. In combination with the binder-arm in an automatic binder, a compressor-arm moving with the binder-arm until the gavel is collected and given an accelerated motion as the binding is completed, to eject the bound sheaf from the machine.

13. In combination with the binder-arm, a spring-seated compressing and ejecting arm moving therewith.

14. In combination with the binder-arm and the compressor-arm moving therewith, the two springs acting in opposing directions upon the compressor-arm.

15. In combination with the binder-arm and the compressor-arm moving therewith, an opposing compressor-arm vibrating to and from the binder-arm, and devices acting upon the first compressor-arm to accelerate its motion as the second is opened therefrom.

16. In combination with the binder-arm and a compressor-arm moving therewith, an opposing compressor-arm vibrated by the binder-arm in its passage, and coacting pins and cam-surfaces upon the several arms, whereby, as the gavel is collected and bound, the two compressor-arms are first held closed toward each other to compress the gavel, then move together as it is being bound, and, finally, the second opened away from the first and the latter given an accelerated action, to throw the bound sheaf clear of the machine.

17. In combination with the binder-arm, a compressing-arm moving therewith, and having a wire-guide at the point, substantially as described.

18. In combination with a binder-arm and a compressing and band-guiding arm moving therewith, an opposing vibrating compressing-arm.

19. In combination with the binder-arm and twisting mechanism in an automatic binder, an arm actuated to press against and withdraw the twisted ends of the band from the twister as the fastening is completed.

20. In combination with the binder-arm, an arm traveling therewith, having an independent onward movement as the binding is completed, and a finger upon said arm, arranged to press the twisted ends of the band from the twisting mechanism in said movement.

21. In combination with the binder-arm, a compressing and ejecting arm traveling therewith, having a wire-guide at the point, to present the wire to the twister for its action, and withdraw the united ends therefrom as this terminates and the sheaf is ejected.

22. In an automatic binder, a standard for the support of the binder-arm and its immediate driving mechanism, formed integral with a subtending arm or bracket for the support of the converse portions of the band-securing mechanism.

23. In an automatic binder, the post, frame, or standard having formed integral therewith an overhanging arm or bracket for the support of the main shaft and binder-arm, and a subtending arm or bracket for the support of the converse portions of the band-securing mechanism, to maintain permanent relation between the parts.

24. The combination of the pinion G, plate H, and pawl I with the arm J and flange *j*, to operate as set forth.

25. The combination of compressor-arm P and its pin W with compressor-arm O and its cam V, substantially as described.

26. In combination with the compressing and carrying arms M O P, the cam T, and pin S, cam-plate Y and pin W, substantially as described, to effect an acceleration of the motion of the arm O to discharge the gavel.

27. The apron B′, divided longitudinally and the parts separated, as described, in combination with the binding-arm M, substantially as and for the purpose set forth.

28. The take-up pulley F, constructed with an inclosed take-up spring, the friction-roller *e′*, and the orifice *f′*, to receive the binding-wire at or near the center of revolution, as and to operate in the manner set forth.

S. D. LOCKE.

Witnesses:
R. D. O. SMITH,
C. CLARENCE POOLE.